May 30, 1967 R. H. ALLMARK 3,322,966

TRANSISTOR PULSE AMPLIFIER CONTROLLED BY LIGHTLY DAMPED OSCILLATORY CIRCUIT

Filed Dec. 12, 1963 2 Sheets-Sheet 2

3,322,966

TRANSISTOR PULSE AMPLIFIER CONTROLLED BY LIGHTLY DAMPED OSCILLATORY CIRCUIT

Reginald Hugh Allmark, Stroke-on-Trent, England, assignor to The English Electric Company Limited, London, England, a British company Filed Dec. 12, 1963, Ser. No. 332,993
5 Claims. (Cl. 307—88.5)

Figure 1:
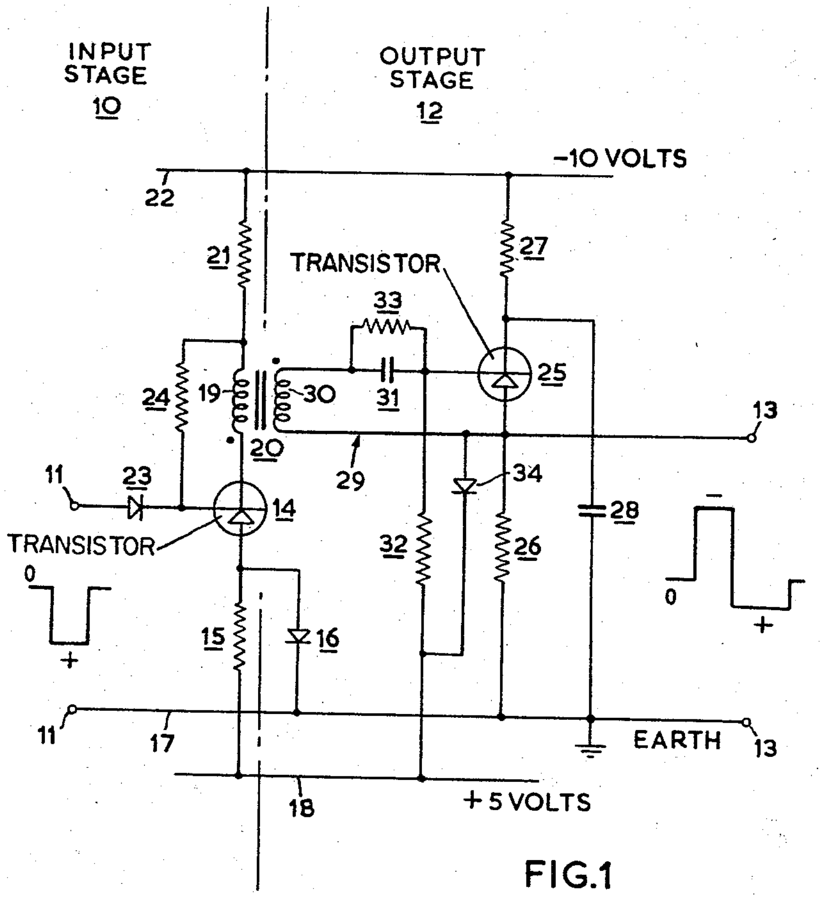

This invention relates to an electric pulse amplifier.

According to the present invention an electric pulse amplifier includes a first electric circuit for connection to a source of steady potential and including a transistor having emitter, base, and collector electrodes, and a resistor connected in series with the emitter-collector path of the transistor, a lightly-damped series type oscillatory electric circuit (hereafter referred to as the second electric circuit) connected between the base and emitter electrodes of the transistor and including a capacitor and an inductor connected in series with one another and with the base-emitter path of the transistor, biasing means connected between the base and emitter electrodes for biasing the transistor to the non-conductive condition, input circuit means electro-magnetically coupled with the second electric circuit for inducing in the second electric circuit in response to input voltage pulses of rectangular waveform received by the input circuit means, at the beginning of each such input voltage pulse a first voltage signal for causing a flow of base current in the second electric circuit which is greater than that required to saturate the transistor, and at the end of each such input voltage pulse a second voltage signal of sense opposite to that of the first voltage signal for causing the transistor to revert to its non-conductive condition, the second electric circuit having a natural frequency such that the base current established by the first voltage signal reverses naturally in sense before the second voltage signal is induced in the second electric circuit in response to the end of an input voltage pulse of predetermined nominal duration, and output circuit means connected to either side of the said resistor for presenting as an output signal a voltage developed across the resistor.

Preferably, the input circuit means includes an electromagnetic transformer having a primary winding and a secondary winding, the secondary winding constituting the said inductor of the oscillatory circuit, and current control means connected in series with the primary winding for supplying thereto when energised a direct current, the current control means being responsive to each input voltage pulse and being effective in response to the beginning of each such input voltage pulse to change the magnitude of the primary winding current abruptly in one sense, and in response to the end of each input voltage pulse to cause the said magnitude to revert abruptly to its former value.

The current control means may in a preferred arrangement include a transistor (referred to hereafter as the second transistor) having its emitter-collector path connected in series with the transformer primary winding, biasing means connected between base and emitter electrodes of this second transistor for biasing this second transistor, when connected with a source of steady potential, to a state of conduction just short of saturation and base control means responsive to the input voltage pulses and connected between the base and emitter electrodes of the second transistor for suppressing the flow of base current in the second transistor whenever an input voltage pulse is present.

Figure 2:
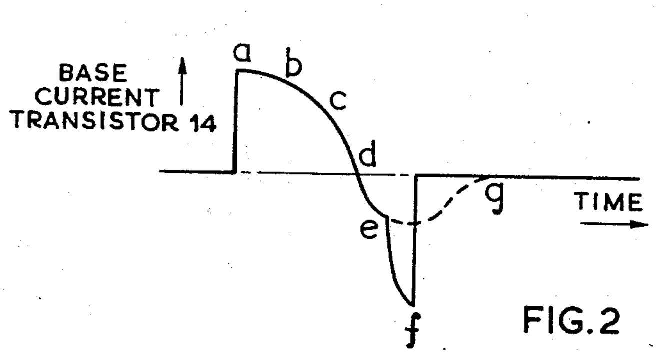
Figure 3:
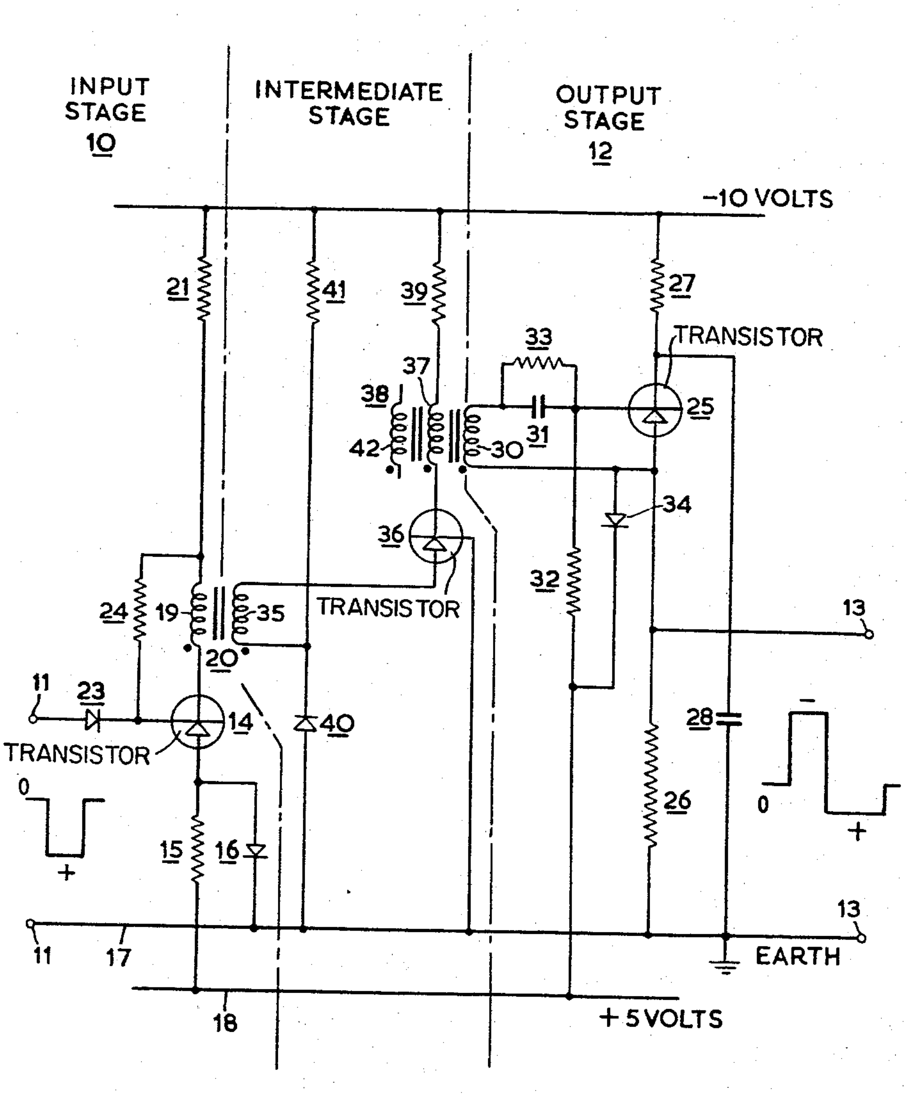

One electric pulse amplifier according to the present invention for use in an electric digital computer will now be described by way of example, and with reference to the accompanying drawings. FIG. 1 of the drawing shows a circuit diagram of the amplifier; FIG. 2 shows graphically the manner in which the base current of an output stage transistor varies with time; and FIG. 3 shows a circuit diagram of a modified pulse amplifier.

Referring now to FIG. 1 of the drawing, the pulse amplifier includes an input stage generally indicated at 10 having input terminals 11 for receiving positive going input voltage pulses of rectangular form as shown, and an output stage generally indicated at 12 controlled by the input stage and having output terminals 13 at which in response to each such input voltage pulse is produced a negative-going output voltage pulse of rectangular form, and of constant predetermined amplitude and substantially constant predetermined width or duration.

The input stage 10 includes a p-n-p type transistor 14 which has its emitter connected to an emitter biasing circuit which includes in series a resistor 15 and a diode 16. This biasing circuit is connected as shown between an earth conductor 17 and a +5 volts supply conductor 18 so that the emitter is held at a potential of approximately +½ volt.

The collector of the transistor is connected through a primary winding 19 of a transformer 20 and a resistor 21 to a −10 volts supply conductor 22, whilst the base of the transistor is connected through a diode 23 to one of the input terminals 11, and through a resistor 24 to the junction of the transformer primary winding 19 and the resistor 21. The resistors 21 and 24 are so proportioned that when the input voltage signal applied to the terminals 11 is of zero value the flow of base current through the resistor 24 is just sufficient to support the flow of current in the collector circuit of the transistor, with the transistor functioning in a condition just short of saturation.

The ouput stage 12 includes a p-n-p type transistor 25 which has its emitter connected through a resistor 26 (which functions as an emitter load) to the earth conductor 17, and its collector connected through a small short-circuit current limiting resistor 27 to the −10 volts supply conductor 22. A decoupling capacitor 28 is connected between the collector and the earth conductor 17, whilst the output terminals 13 are connected at opposite ends of the emitter load resistor 26.

A lightly damped tuned series circuit 29 comprising the secondary winding 30 of the transformer 20 and capacitor 31 is connected between the base and emitter of the transistor 25. The base of the transistor 25 is also connected through a resistor 32 to the +5 volts supply conductor 18, and a resistor 33 connected in parallel with the capacitor 31 provides a discharge path for this capacitor.

A diode 34 connects the emitter of the transistor 25 to the +5 volts supply conductor 18, and hence tends to limit the positive potential that may appear at the emitter of this transistor.

The amplifier is suitable for supplying output current pulses to a load circuit (not shown) which includes a primary winding of a transformer and a p-n-p type gating transistor connected between the primary winding and the earth conductor 17.

The operation of the amplifier when supplying a load circuit as aforesaid connected to the output terminals 13 is as follows. With zero input signal applied at the input terminals 11 the transistor 14 is in a stable conductive condition just short of saturation, in which condition the flow of current in the collector circuit is just maintained by the flow of base current through the resistor 24. Any tendency for this collector current to vary is countered by a consequent and opposite variation in the potential of the junction of the primary winding 19 and the resistor 21, and hence in base current.

The transistor 25 is maintained in the non-conductive condition with a suitable positive potential at its base by the flow of current from the +5 supply conductor 18 to the earth conductor 17 through the chain of resistors 32, 33 and 26.

On the occurrence of a positive-going input pulse at the terminals 11, the base of transistor 14 is carried positively relative to the emitter so that this transistor 14 cuts off rapidly. The rapid decay of current in the primary winding 19 of the transformer 20 induces a negative-going E.M.F. in the tuned series circuit 29 with a result that a large base current flows in the transistor 25. This base current is greatly in excess of that required to supply the designed load for connection to the output terminals 13 so that the transistor 25 rapidly becomes fully conductive. The consequent flow of current in the emitter-collector circuit rapidly depresses the voltage of both the emitter and the base towards that of the −10 volt supply conductor 22, thus producing the steep front of a negative-going output pulse at the terminals 13. The fall in emitter and base potentials is arrested when the transistor becomes saturated due to the excess of charge in the transistor, the base potential then being temporarily below that of the collector.

The transistor 25 remains in this saturated state whilst the base current flowing in the tuned circuit decreases, as shown in FIG. 2 by the curve *a, b, c, d,* in the manner determined by the constants of the lightly damped tuned circuit.

Eventually at *d* the base current reverses and starts to reduce the base charge stored in the transistor.

The completion of the input pulse at the terminals 11 results in the rapid return of the transistor 14 to its previous near-saturated conductive condition, and the consequent growth of current in the primary winding 19 of the transformer 20 results in the induction of a positive-going E.M.F. and current in the tuned series circuit. (FIG. 2. points *e–f*). This rapidly reduces the remaining base charge of the transistor 25 and thus renders this transistor once more non-conductive. (FIG. 2. point *f*). As a result the emitter current of this transistor falls rapidly and terminates the negative outgoing pulse developed at the terminals 13.

The positive voltage applied to the emitter and to the output terminals 13 by the normal inductive load connected to the terminals 13 is limited to +5 volts magnitude by conduction of the diode 34, and the positive swing in the output signal consequently persists for approximately twice the duration of the negative swing.

The capacitor 31 of the tuned circuit is left highly charged at the end of the negative output pulse in a sense such as to maintain the transistor 24 non-conductive, and this charge is dissipated in the shunt resistor 33 before the next input pulse is to be received at the terminals 11. After the discharge of this capacitor 31 the base of transistor 25 is held at the aforesaid positive potential by the flow of current through the circuit which includes the resistors 32, 33, the winding 30 of the transformer 20, and the resistor 26.

The duration of the negative output pulse is determined largely by the characteristics of the lightly-damped tuned series circuit, and the large excess of base charge stored in the transistor 25 during the initial flow of base current.

This excess of base charge has to be removed before the transistor 25 can revert to its non-conductive condition so that even if the input pulse is of shorter than normal duration, the necessary removal of excess base charge in the transistor 25 tends to lengthen the duration of the output pulse relative to that of the input pulse.

Similarly if the input pulse is of longer than normal duration, the reversal of base current in the tuned emitter-base circuit starts to remove the excess base charge before the end of the input pulse occurs, so that less excess base charge has to be removed by the reverse E.M.F. induced in the tuned circuit by the end of the input pulse. Hence the pulse duration tends to be very close to that occurring in response to an input pulse of normal duration. Even if the input pulse is of very long duration the reverse flow of current in the tuned circuit results in the complete removal of the base charge of the transistor by the time point *g* in FIG. 2 is reached so that the transistor 24 is cut off, and the output pulse terminated, before the end of the input pulse occurs.

This pulse amplifier thus tends to produce from input pulses of varying duration, output pulses of more or less standardized duration, and of constant predetermined amplitude. Thus several such amplifiers may be used in a cascade manner without experiencing any appreciable depreciation in pulse form.

Though in the above described embodiment the tuned series circuit 29 has been excited directly by the input stage transformer 20, in a modified amplifier which is similar to that described the secondary winding 30 connected in the tuned circuit is instead a secondary winding of an intermediate transformer which has a primary winding which is in turn excited by a secondary winding of the transformer 20 of the input stage.

Thus in FIG. 3 which shows the circuit diagram of such a modified amplifier the input and output stages 10 and 12 are the same as those of FIG. 1, but the secondary winding 35 of the transformer 20 of the input stage is connected in the emitter circuit of a grounded-base transistor 36. The collector circuit of this transistor includes a primary winding 37 of an intermediate transformer 38 and a short-circuit current limiting resistor 39. The emitter circuit of the transistor is biased by a circuit which includes a diode 40 and a resistor 41, the emitter being biased negatively with respect to the base so that this transistor is normally held in the non-conductive condition.

The interruption of current flow in the primary winding 19 of the input stage transformer 20 on the occurrence of an input pulse causes the transistor 36 to conduct, and the consequent growth of collector current in the primary winding 37 of the intermediate transformer 38 excites the secondary winding 30 of the tuned series base-emitter circuit of the transistor 25 in the same manner as that described with reference to FIG. 1.

This modified amplifier by having a step-down turns ratio for the input stage transformer 20 can be made to deliver a more substantial output current pulse, and furthermore the intermediate transformer 38 may be provided if desired with a further secondary winding 42 for simultaneously exciting a second output stage which is similar to that already shown.

What I claim as my invention and desire to secure by Letters Patent is:

1. An electric pulse amplifier including a first electric circuit for connection to a source of steady potential and including a transistor having emitter, base, and collector electrodes, and a resistor connected in series with the emitter-collector path of the transistor, a lightly-damped series type oscillatory electric circuit (hereafter referred to as the second electric circuit) connected between the base and emitter electrodes of the transistor and including a capacitor and a first inductive winding connected in series with one another and with the base-emitter path of the transistor, biasing means connected between the base and emitter electrodes for biasing the transistor to the non-conductive condition, and input circuit means including a second inductive winding electro-magnetically coupled with the first inductive winding, and input signal controlled electric current supply means connected in series with the second inductive winding for supplying thereto direct current which changes abruptly between first and second spaced levels in response to input pulse signals of rectangular waveform and predetermined nominal duration, the natural frequency of the said oscillatory circuit having a quarter cycle time slightly less than the predetermined nominal duration of the input pulse signals, and the change in current in the second inductive winding at the beginning of an input pulse signal being great enough to induce a state of substantial saturation in the transistor, and output circuit means connected to said resistor for presenting as an output signal a voltage developed across the resistor.

2. An electric pulse amplifier according to claim 1, wherein the said current supply means includes a transistor (referred to hereafter as the second transistor) having its emitter-collector path connected in series with the second inductive winding, biasing means connected between base and emitter electrodes of this second transistor for biasing this second transistor, when connected with a source of steady potential, to a state of conduction just short of saturation, and base control means responsive to the input pulse signals and connected between the base and emitter electrodes of the second transistor for suppressing the flow of base current in the second transistor whenever an input pulse signal is present.

3. An electric pulse amplifier according to claim 1, wherein the said current supply means includes a transformer having primary and secondary windings, a transistor (referred to hereafter as the second transistor) having its emitter-collector path connected in series with the said primary winding, biasing means connected between base and emitter electrodes of the second transistor for biasing the second transistor to a state of conduction just short of saturation, base control means responsive to the input pulse signals and connected between the base and emitter electrodes of the second transistor for suppressing the flow of base current in the second transistor whenever an input pulse signal is present, a transistor (referred to hereafter as the third transistor) having its emitter-collector path connected in series with the said second inductive winding, and means connecting the secondary winding between base and emitter electrodes of the third transistor.

4. An electric pulse amplifier according to claim 2, wherein the said resistor is connected adjacent the emitter of the first-mentioned transistor and acts as an emitter load, and including means responsive to the emitter potential of the first-mentioned transistor for preventing that potential exceeding a predetermined value when the current in the second inductive winding changes at the end of each input pulse signal.

5. An electric pulse amplifier according to claim 3, wherein the said resistor is connected adjacent the emitter of the first-mentioned transistor and acts as an emitter load, and including means responsive to the emitter potential of the first-mentioned transistor for preventing that potential at a predetermined value when the current in the second inductive winding changes at the end of each input pulse signal.

References Cited

UNITED STATES PATENTS

| | | | |
|---|---|---|---|
| 2,666,849 | 1/1954 | Johnson et al. | 328—223 |
| 2,897,378 | 7/1959 | Jones | 307—88.5 |
| 3,053,994 | 9/1962 | Heijn et al. | 307—88.5 |
| 3,171,985 | 3/1965 | Freimanis | 307—88.5 |

ARTHUR GAUSS, *Primary Examiner.*

S. D. MILLER, *Assistant Examiner.*